(12) United States Patent
Salman et al.

(10) Patent No.: US 11,525,721 B1
(45) Date of Patent: Dec. 13, 2022

(54) MICROFLOW SENSOR AND METHOD OF MAKING THE SAME

(71) Applicant: KING FAISAL UNIVERSITY, Al-Ahsa (SA)

(72) Inventors: Saed A. Salman, Al-Ahsa (SA); Abdullah Aljaafari, Al-Ahsa (SA); Adil Alshoaibi, Al-Ahsa (SA); Mohd Al Saleh Al Othoum, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 17/835,934

(22) Filed: Jun. 8, 2022

(51) Int. Cl.
*G01F 1/684* (2006.01)

(52) U.S. Cl.
CPC .......... *G01F 1/6842* (2013.01); *G01F 1/6845* (2013.01)

(58) Field of Classification Search
CPC combination set(s) only.
See application file for complete search history.

(56) References Cited

U.S. PATENT DOCUMENTS

| | | | |
|---|---|---|---|
| 6,591,675 B1 | 7/2003 | Doderer et al. | |
| 8,166,814 B2 * | 5/2012 | Ike | G01F 1/6845 73/204.25 |
| 8,677,818 B2 | 3/2014 | Landsburger et al. | |
| 10,739,175 B1 * | 8/2020 | Salman | G01F 1/6842 |
| 2009/0206293 A1 * | 8/2009 | Beerling | F16K 99/0001 251/331 |

FOREIGN PATENT DOCUMENTS

| | | |
|---|---|---|
| JP | 2000227766 A | 8/2000 |
| JP | 2004198283 A | 7/2004 |

* cited by examiner

*Primary Examiner* — Brandi N Hopkins
(74) *Attorney, Agent, or Firm* — Nath, Goldberg & Meyer; Richard C. Litman

(57) ABSTRACT

The microflow sensor includes a base wafer having opposed upper and lower surfaces, and a cap wafer, also having opposed upper and lower surfaces. The base wafer and the cap wafer may be formed from a semiconductor material. A flow sensing element is embedded in the upper surface of the base wafer. The flow sensing element may be any suitable type of flow sensing element, such as a central heater and at least one temperature-sensitive element. A flow channel is formed in the lower surface of the cap wafer and extends continuously between first and second longitudinally opposed edges of the cap wafer. The lower surface of the cap wafer is bonded to the upper surface of the base wafer such that fluid flowing through the flow channel passes above and across the sensing element.

13 Claims, 8 Drawing Sheets

MICROFLOW SENSOR AND METHOD OF MAKING THE SAME

BACKGROUND

1. Field

The disclosure of the present patent application relates to sensors, fluid measurement and testing, and particularly to a microflow sensor and method of making the same.

2. Description of the Related Art

Semiconductor flow sensors, such as thermoanemometers and the like, are devices used in the measurement and testing of flow and differential pressure in gases and liquids. Such flow sensors are typically provided in the form of a semiconductor chip, which includes a central microscopically sized flow channel, allowing fluid to flow over an internal sensing element. In a thermoanemometer, for example, the sensing element typically includes a central heater and a pair of temperature-sensitive elements symmetrically disposed on opposite sides of the heater. The heater heats a local volume of gas or liquid in the flow through the channel, which is pushed over the temperature sensing element in the flow path distal from the heater and induces a temperature differential in the two temperature-sensitive elements, which is further converted into an electrical signal that can be analyzed external to the flow sensor.

FIG. 2 illustrates a prior art semiconductor flow sensor 100, including a semiconductor chip 118 mounted on a semiconductor package base 112, which is covered by a package cap 120. The bottom of the package cap 120 defines a flow passage 110, such that fluid flowing through inlet port 102 and out of outlet port 104 passes over and across the semiconductor chip 118 having the flow sensing elements formed thereon. The flow channel 110 is defined by the package. Although effective, such flow sensors must be manufactured as individual units, thus making them susceptible to misalignment variations between the package and the sensing elements on the semiconductor chip, in addition to relatively high costs of manufacture.

Other known flow sensors, such as those shown in FIGS. 2a-2e of U.S. Pat. No. 8,677,818, issued Mar. 35, 2014 to Landsberger et al., which is hereby incorporated by reference in its entirety, have flow channels defined in the semiconductor chip itself. In this case, inlet and outlet openings to and from the flow channel may be formed in the top and bottom surfaces of the chip, respectively, in either the top or bottom surface and in the side of the chip, or both openings may be formed in either the top surface or the bottom surface of the chip. In any case, this construction may require forming inlet and outlet ports or vents in the packaging and aligning the ports in the packaging with the flow channel openings in the semiconductor chip. Again, the process is expensive and subject to misalignment between the semiconductor packaging and the chip. Thus, a microflow sensor and a method of making the same solving the aforementioned problems are desired.

SUMMARY

The microflow sensor includes a base wafer having opposed upper and lower surfaces, and a cap wafer, also having opposed upper and lower surfaces. The base wafer and the cap wafer may be formed, for example, from a semiconductor material, such as silicon. A flow sensing element is embedded in the upper surface of the base wafer. A longitudinally or linearly extending flow channel is formed in the lower surface of the cap wafer and extends continuously between first and second opposed edges of the cap wafer. The longitudinally extending flow channel may have a central portion positioned above the flow sensing element, where the central portion has a lateral width greater than the lateral width of the remainder of the longitudinally extending flow channel. The lower surface of the cap wafer is bonded to the upper surface of the base wafer such that fluid flowing through the longitudinally extending flow channel passes above and across the sensing element.

The lower surface of the cap wafer is bonded to the upper surface of the base wafer by adhesive or the like such that fluid flowing through the longitudinally extending flow channel passes above and across the sensing element. The thickness of the adhesive layer may be selected in order to control the pneumatic impedance of the flow sensor in the vertical direction. During the manufacturing process, the thickness of the applied adhesive layer may be selected such that the height of the spacing between the cap wafer and the base wafer is adjustable. For example, the height can be selected during manufacture between three different values: a maximum spacing, a minimum spacing, and a moderate spacing (i.e., between the maximum and minimum spacings). The maximum spacing could be selected to produce sensors designed for low flow impedance; the minimum spacing could be selected to produce sensors designed for high flow impedance; and the moderate spacing could be selected to produce sensors designed for moderate flow impedance. Further, the cap wafer may be provided with longitudinally extending grooves or trenches in order to catch any overflow of adhesive during the bonding process, thus preventing accidentally clogging the flow channel with adhesive.

Similarly, during the manufacturing process, the width of the flow channel could be selected to tailor or customize the horizontal flow impedance of the sensor by adjusting the horizontal spacing of the flow channel. For example, the width can be selected during manufacture between three different values: a maximum width, a minimum width, and a moderate width (i.e., between the maximum and minimum widths). The maximum width could be selected to produce sensors designed for low flow impedance; the minimum width could be selected to produce sensors designed for high flow impedance; and the moderate width could be selected to produce sensors designed for moderate flow impedance.

It should be understood that the flow sensing element may be any suitable type of flow sensing element. For example, the flow sensing element may include a central heater and a pair of temperature-sensitive elements positioned adjacent to and symmetrically disposed on opposite sides of the central heater, similar to a conventional thermoanemometer-flow sensor. As is well known in the art, the temperature-sensitive elements may each be, for example, a thermoresistor or a thermocouple. In this example, the sensing element is disposed transverse to the direction of fluid flow, so that the fluid passes over a first temperature sensitive element, then the heater, and then the second temperature sensitive element. The heater heats gas or liquid flow passing in close proximity to the heater, which then passes over the second temperature sensitive element, producing a temperature differential between the two temperature-sensitive elements, which is further converted into an electrical signal. The flow sensing element is calibrated to the flow parameter of interest, as known in the art.

Multiple flow sensors may be produced simultaneously by etching a plurality of longitudinally extending flow channels in a lower surface of a cap wafer sheet. Each longitudinally extending flow channel extends continuously in a straight line between opposed edges of the cap wafer sheet. A plurality of the flow sensing elements are embedded in an upper surface of a base wafer sheet, such that the plurality of flow sensing elements are rectangularly arrayed in rows and columns. The rows are aligned with the plurality of flow channels etched in the lower surface of the cap wafer sheet. The lower surface of the cap wafer sheet is then bonded to the upper surface of the base wafer sheet to form an array of flow sensors.

The bonded cap wafer sheet and base wafer sheet are first diced parallel to and between adjacent flow channels, and then between adjacent columns of the flow sensing elements, which provides access openings to the flow channel on opposite edges of each die formed by dicing the bonded wafers.

In order to protect the longitudinally extending flow channels from clogging during the dicing process, each flow channel may be provided with widened inlets and outlets, relative to the width of the remainder of the flow channel. Thus, during the manufacturing process, the wider fluid inlets and wider fluid outlets will be positioned symmetrically about the scribe lines where the adjacent columns of flow sensing elements are diced. Thus, during the dicing process along scribe lines, if any debris is produced, the possibility of clogging any of the fluid inlets or the fluid outlets is minimized due to the increased width.

The flow sensor may be integrated into a flow sensor package. In one exemplary embodiment, the package may include a package substrate and a hollow package cover, which is mounted on the substrate to define an open interior region. The hollow cover is provided with first and second laterally opposed fluid flow ports. The flow sensor is mounted on the substrate such that the flow channel is aligned in the same direction as the ports. A longitudinally extending fluid barrier may be mounted between the upper surface of the cap wafer and the inner surface of the hollow cover transverse to the direction of fluid flow to define an inlet chamber and an outlet chamber, and to prevent unwanted fluid cross-flow or mixing of the inlet fluid with the outlet fluid within the package.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 3:
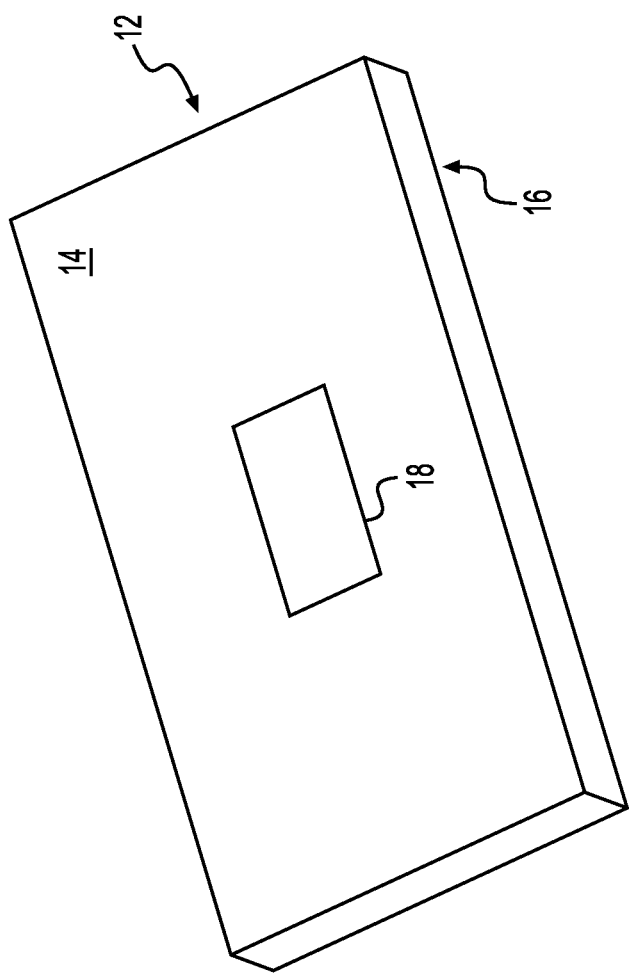
FIG. 3 is diagrammatic perspective view of a base wafer of the microflow sensor semiconductor chip of FIG. 1 as seen from above.
Figure 4:
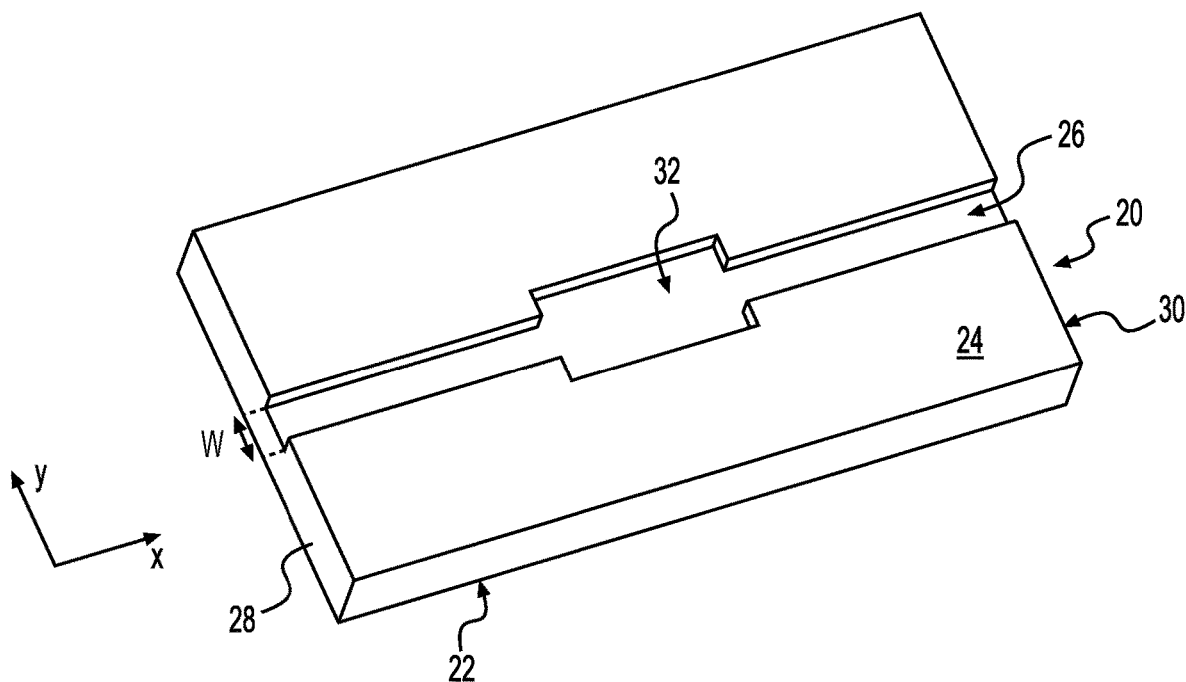
FIG. 4 is a perspective view of the cap wafer of the microflow sensor semiconductor chip of FIG. 1, showing the lower surface of the cap wafer.
Figure 5A:
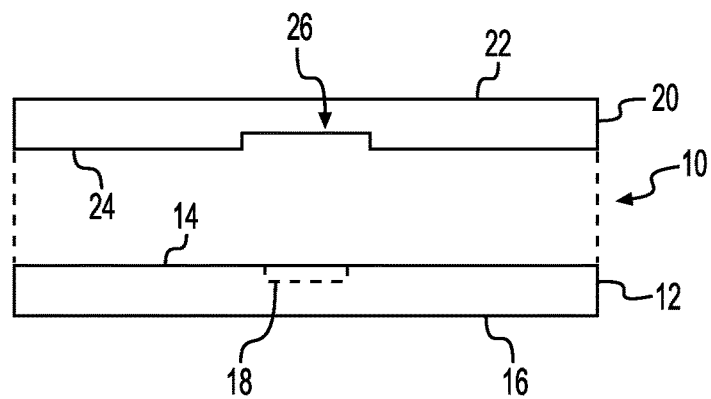
FIG. 5A is a partially exploded side view of the microflow sensor semiconductor chip of FIG. 1, showing the cap wafer raised above the base wafer.
Figure 5B:
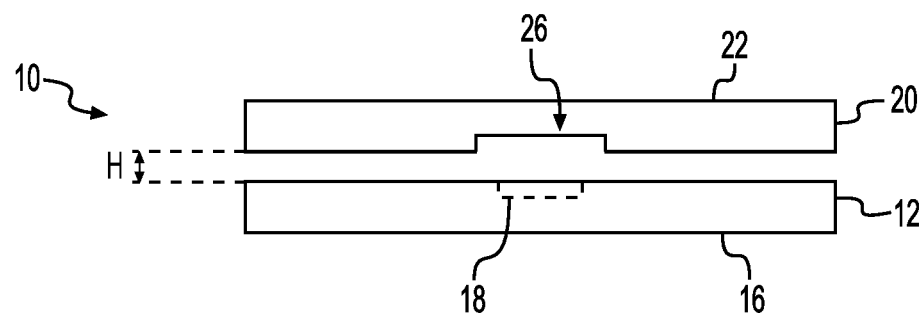
FIG. 5B is a side view of the microflow sensor semiconductor chip of FIG. 1.

Referring to FIGS. 1, 3, 4, 5A and 5B, the microflow sensor 10 includes a base wafer 12, having opposed upper and lower surfaces 14, 16, respectively, and a cap wafer 20, also having opposed upper and lower surfaces 22, 24, respectively. The base wafer 12 and the cap wafer 20 may be formed from a semiconductor material, such as silicon or the like. A flow sensing element 18 is embedded in the upper surface 14 of the base wafer 12. As shown in FIGS. 3, 5A and 5B, the upper sensing face of the flow sensing element 18 may be flush with the upper surface 14 of the base wafer 12. It should be understood that the vertical orientation shown in FIGS. 5A and 5B may be reversed, i.e., the base wafer 12 and the cap wafer 20, as will be described in greater detail below, may be interchanged.

Figure 1:
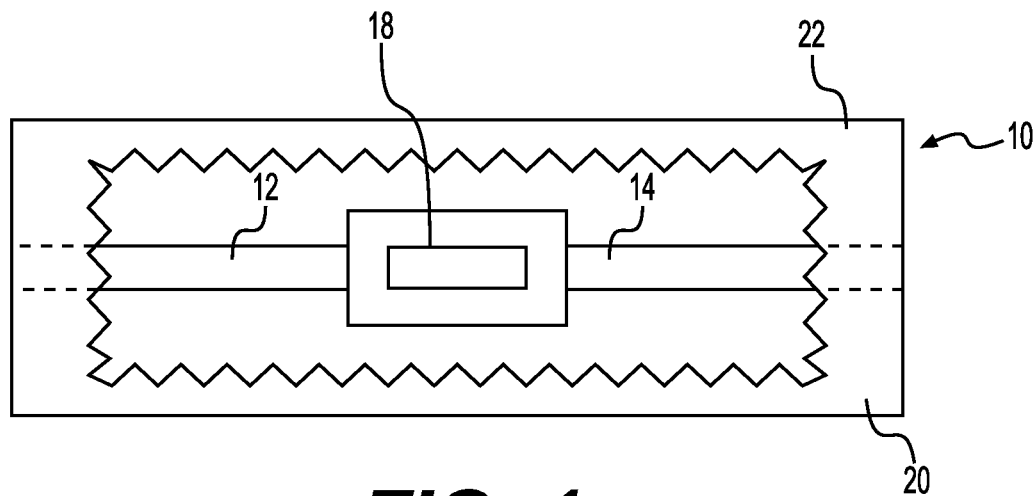
FIG. 1 is a diagrammatic top view of a microflow sensor semiconductor chip, shown with the cap wafer broken away to show details of the interior of the chip.
Figure 2:
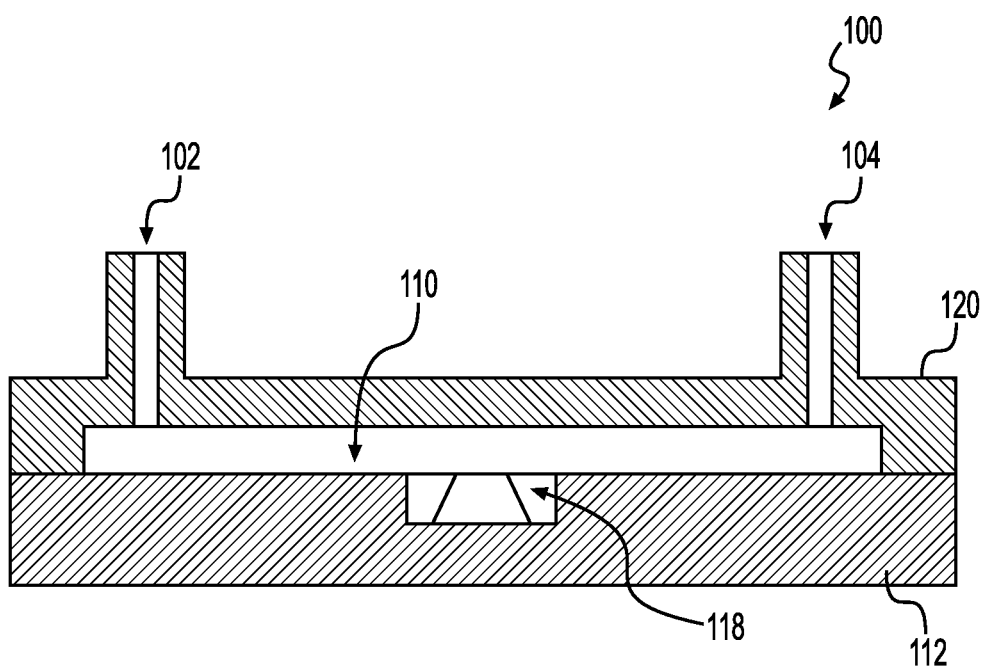
FIG. 2 is a side view in section of a prior art flow sensor packaged semiconductor.

As best shown in FIGS. 1 and 4, a longitudinally or linearly extending flow channel 26 is formed in the lower surface 24 of the cap wafer 20 and extends continuously between first and second longitudinally opposed edges 28, 30 of the cap wafer 20, defining a fluid inlet and a fluid outlet in the edges 28, 30, as shown, such that the longitudinally extending flow channel 26 provides edge-to-edge fluid flow. The longitudinally extending flow channel 26 may be formed by conventional etching or the like. In FIG. 4, the longitudinal direction corresponds to the x-axis, and the orthogonal lateral direction corresponds to the y-axis.

The longitudinally extending flow channel 26 may have a central portion 32 positioned above the sensing element 18, the central portion 32 having a lateral width greater than the lateral width of the remainder of the longitudinally extending flow channel 26, which may be uniform in width. The dimensions of the central portion 32, as well as the lateral width of the remainder of the longitudinally extending flow channel 26 along with its depth, may be selected to control the pneumatic impedance of the microflow sensor 10. The pneumatic impedance is a parameter that defines the sensor performance (i.e., its sensitivity), as well as its lifespan, which is typically limited by dust-induced clogging. As shown, the lower surface 24 of the cap wafer 20 is bonded to the upper surface 14 of the base wafer 12 (e.g., by adhesive) such that fluid flowing through the longitudinally extending flow channel 26 passes above and across the sensing element 18.

Along with the selection of the above-mentioned parameters, the thickness of the adhesive layer may also be selected in order to control the pneumatic impedance of the flow sensor. For purposes of illustration, the adhesive layer is not shown in FIG. 5B. However, it should be understood that the adhesive layer is used to not only secure the cap wafer 20 to the base wafer 12, but also to provide the desired spacing therebetween, i.e., during the manufacturing process, the thickness of the applied adhesive layer is selected such that the height H of the spacing between the cap wafer 20 and the base wafer 12 is adjustable. Here, the height H is measured in a direction that is perpendicular to both the longitudinal x-axis and the lateral y-axis of FIG. 4. For example, the height H can be selected during manufacture between three different values, including a maximum spacing, a minimum spacing, and a moderate spacing (i.e., between the maximum and minimum spacings). The maximum spacing could be selected to produce sensors designed for low vertical flow impedance; the minimum spacing could be selected to produce sensors designed for high vertical flow impedance; and the moderate spacing could be selected to produce sensors designed for moderate vertical flow impedance.

Similarly, returning to FIG. 4, during the manufacturing process, the width of flow channel 26 could be selected to tailor or customize the flow impedance of the sensor. In FIG. 4, the width W of flow channel 26 is measured along the lateral y-axis. For example, the width W can be selected during manufacture between three different values, including a maximum width, a minimum width, and a moderate width (i.e., between the maximum and minimum widths). The maximum width could be selected to produce sensors designed for low flow impedance; the minimum width could be selected to produce sensors designed for high flow impedance; and the moderate width could be selected to produce sensors designed for moderate flow impedance.

Figure 12:
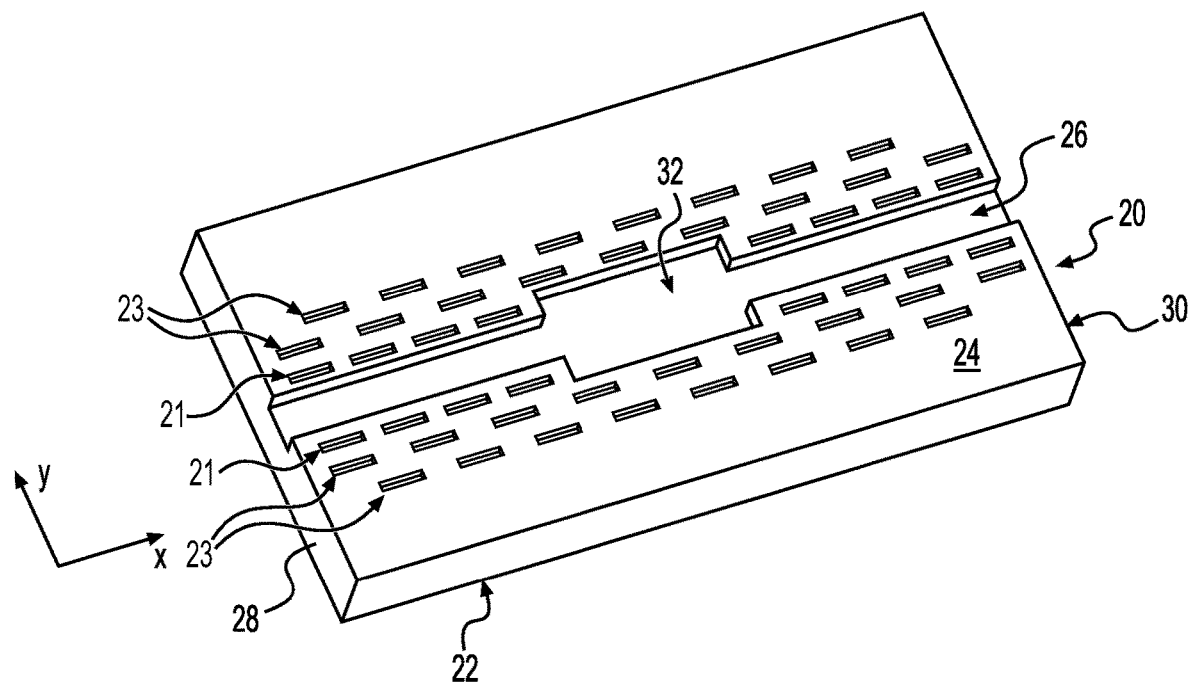
FIG. 12 is a perspective view of another alternative embodiment of the cap wafer of the microflow sensor semiconductor chip, showing the lower surface of the cap wafer.

Further, as shown in FIG. 12, the cap wafer 20 may be provided with longitudinally extending grooves or trenches 21, 23 in order to catch any overflow of adhesive during the bonding process, thus preventing accidentally clogging the flow channel 26 with adhesive. In FIG. 12, it should be understood that the relative depths of the shallow grooves or trenches 21 and the deep grooves or trenches 23 are shown for exemplary purposes only, and that any suitable depth or combinations of depths may be used. Similarly, it should be understood that the particular linear array patterns of longitudinally extending grooves or trenches 21, 23 are shown in FIG. 12 for exemplary purposes only. It should be further understood that the particular number of arrays of each type of grooves or trenches 21, 23 is also shown for exemplary purposes only.

It should be understood that the flow sensing element 18 may be any suitable type of flow sensing element. For example, the flow sensing element 18 may include a central heater and a pair of temperature-sensitive elements positioned adjacent to, and symmetrically arranged about, the central heater, similar to a conventional thermoanemometer-type thermal sensor. As is well known in the art, the temperature-sensitive elements may each be, for example, a thermoresistor or a thermocouple. In this example, gas or liquid flow passing transversely over the sensing element 18, through the longitudinally extending flow channel 26 is heated in the vicinity of the central heater and passes on to the next temperature sensing element in the flow path, causing a temperature difference between the two temperature-sensitive elements, which is further converted into an electrical signal corresponding to a parameter of fluid flow.

Figure 6:
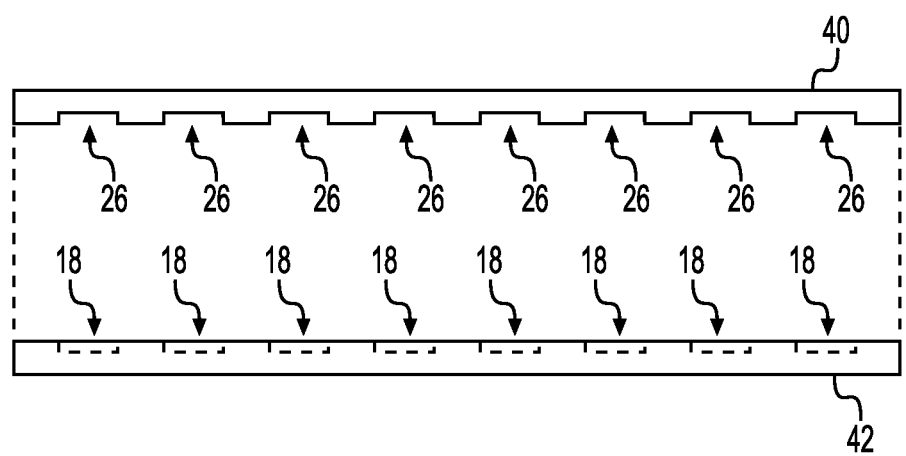
FIG. 6 is a partially exploded side view of a cap wafer sheet being attached to a base wafer sheet in a method of making the microflow sensor semiconductor chip of FIG. 1.
Figure 7:
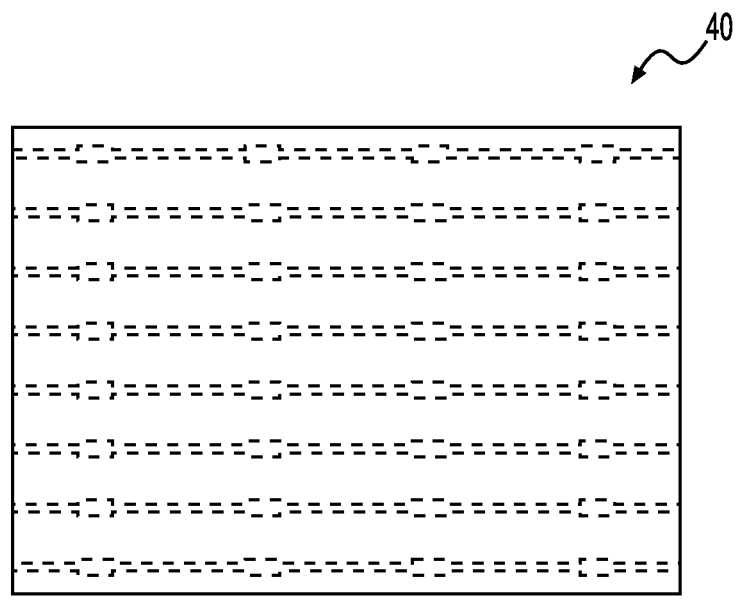
FIG. 7 is a top view of the cap wafer sheet of FIG. 6, shown attached to the base wafer sheet.

As shown in FIGS. 6 and 7, multiple microflow sensors 10 may be produced simultaneously by etching a plurality of longitudinally extending flow channels 26 in a lower surface of a cap wafer sheet 40. Each longitudinally extending flow channel 26 extends continuously between longitudinally opposed edges of the cap wafer sheet 40. As discussed above with reference to FIG. 4, the width of each flow channel 26 may be selected at this stage to tailor or customize the horizontal flow impedance of the resultant sensor.

A plurality of the flow sensing elements 18 are embedded in an upper surface of a base wafer sheet 42, such that the plurality of flow sensing elements 18 are in a rectangular array of rows and columns. As illustrated in FIG. 6, the longitudinally extending rows are aligned with the plurality of longitudinally extending flow channels 26 etched in the lower surface of the cap wafer sheet 40. The lower surface of the cap wafer sheet 40 is then bonded to the upper surface of the base wafer sheet 42 to form the array of unseparated flow sensors shown in FIG. 7. As discussed above with reference to FIG. 5B, the thickness of the applied adhesive layer at this stage may be selected such that the height H of the spacing between the cap wafer sheet 40 and the base wafer sheet 42 is adjustable.

As illustrated in FIG. 6, the longitudinally extending flow channels 26 are etched in the lower surface of the cap wafer sheet 40 prior to the bonding process. Similarly, the flow sensing elements 18 (and any necessary circuit interconnects, which are not shown here for purposes of simplification) are fabricated directly on the base wafer sheet 42, also prior to bonding. The longitudinally extending flow channels 26 are completely formed when the cap wafer sheet 40 is bonded to the base wafer sheet 42, which may be performed using an adhesive material or the like.

Figure 8:
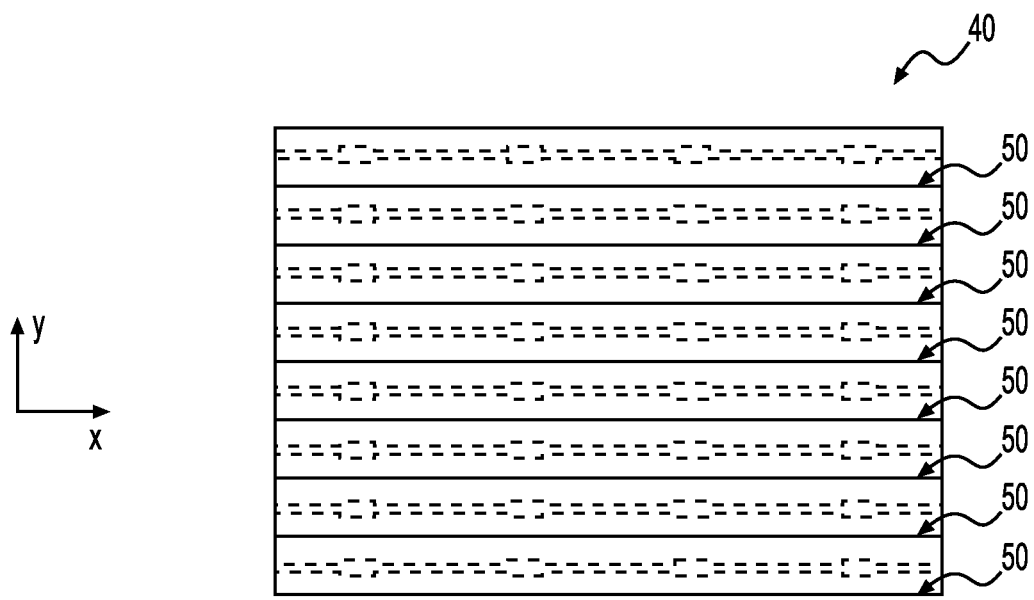
FIG. 8 is a top view of the assembled wafer sheets of FIGS. 6 and 7, showing locations where the assembled wafer sheets are diced between the flow channels in a method of making the microflow sensor semiconductor chip of FIG. 1.
Figure 9:
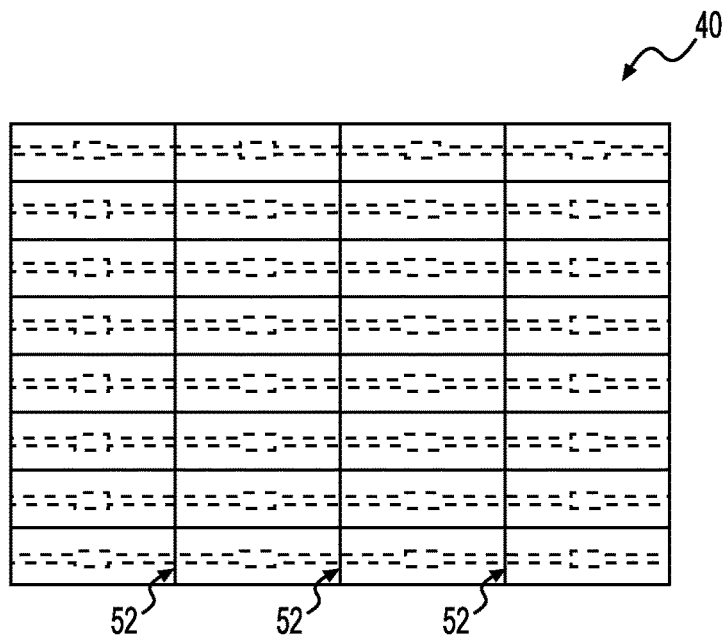
FIG. 9 is a top view of the assembled wafer sheets of FIGS. 6, 7 and 8, showing locations where the assembled wafer sheets are diced between columns of the flow sensor elements, forming flow channel inlets and outlets in a method of making the semiconductor flow sensor chip of FIG. 1.

As shown in FIG. 8, the bonded cap wafer sheet 40 and base wafer sheet 42 are longitudinally diced between adjacent rows of the longitudinally extending rows of the flow sensing elements 18 and between adjacent rows of the longitudinally extending flow channels 26. In FIG. 8, scribe lines 50 show locations where longitudinally extending rows of flow sensors are separated from one another by the longitudinal dicing. The bonded cap wafer sheet 40 and base wafer sheet 42 are then laterally diced between adjacent ones of the laterally extending columns of the sensing elements 18 to form a plurality of the microflow sensors. In FIG. 9, scribe lines 52 show where the laterally extending columns of flow sensors are separated from one another by the lateral dicing, thus producing a plurality of now-separated microflow sensors 10, and simultaneously defining inlet and outlet ports for the flow channel in each of the semiconductor chips formed by the dicing process.

In the above process, the longitudinal dicing of FIG. 8 may be performed prior to the lateral dicing of FIG. 9. The lateral dicing of FIG. 9 is the step which creates the edge-to-edge openings (i.e., the inlets and outlets) of each individual microflow sensor 10. However, in order to avoid clogging of these openings with dicing debris, the longitudinal dicing of FIG. 8 is performed first. During the dicing process, a vacuum or other source of suction may be used to simultaneously remove any dicing debris from the vicinity.

Figure 10:
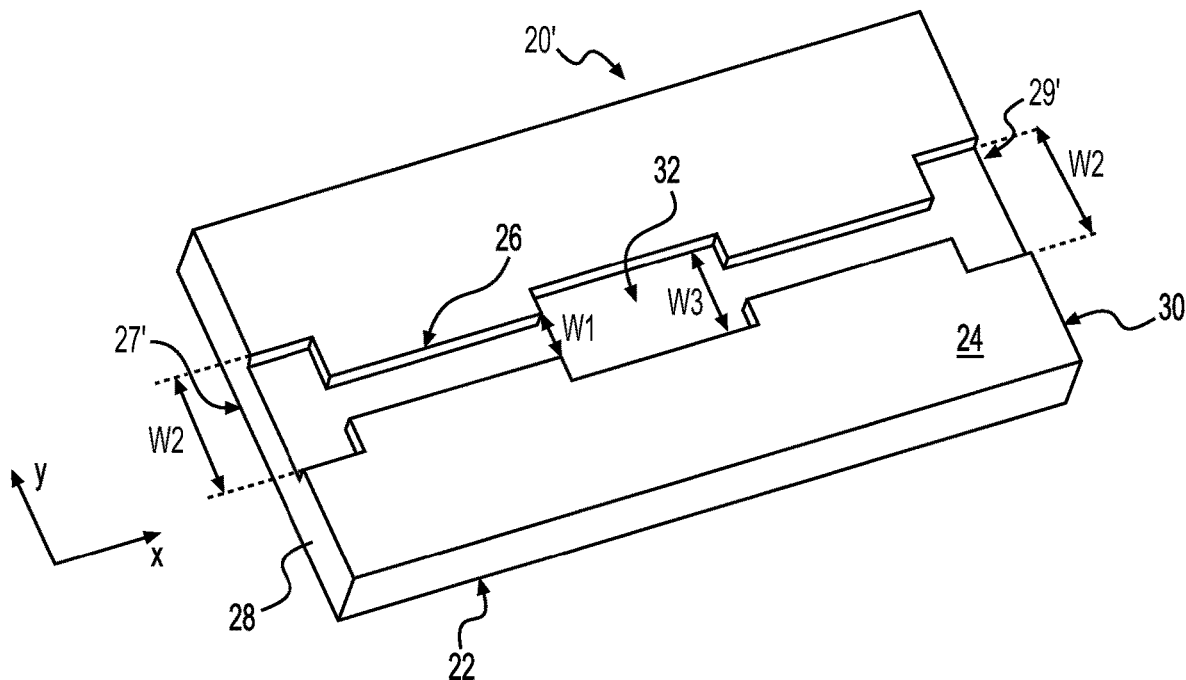
FIG. 10 is a perspective view of an alternative embodiment of the cap wafer of the microflow sensor semiconductor chip, showing the lower surface of the cap wafer.

In order to protect the longitudinally extending flow channels 26 from clogging during the dicing process, each flow channel 26 may be provided with wider inlets and outlets, as shown in FIG. 10. In FIG. 10, cap wafer 20' is provided with a flow channel 26 having a width W1, and central portion 32 has a width W3. As in the previous embodiment, W3 is greater than W1. However, a fluid inlet 27' and a fluid outlet 29' are defined in the longitudinally opposed edges 28, 30, respectively, and both the fluid inlet 27' and the fluid outlet 29' have a width W2, which is greater than the width W1 of the flow channel 26. It should be noted that the width W2 is not necessarily equal to the width W3.

Figure 11:
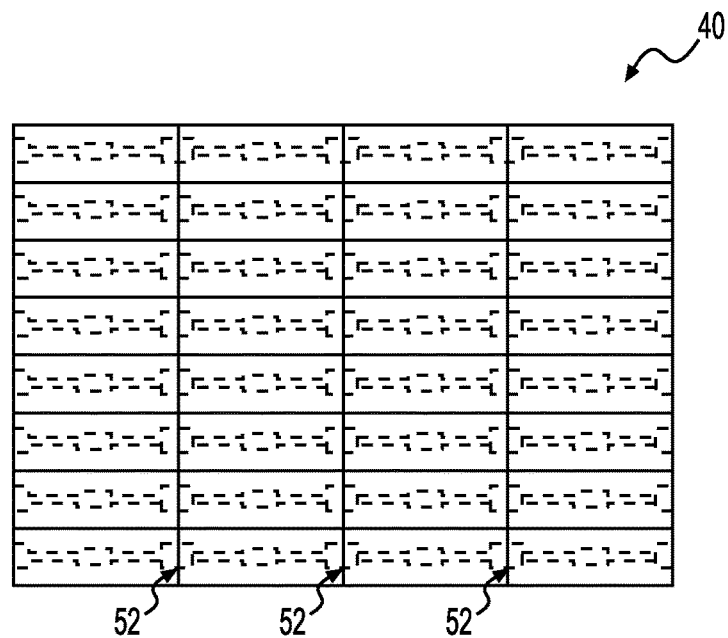
FIG. 11 is a top view of the assembled wafer sheets, similar to FIG. 9, but using the cap wafers of the embodiment of FIG. 10.

The manufacturing process for microflow sensors 10 will remain the same as that described above with reference to FIGS. 7-9. However, as shown in FIG. 11, the wider fluid inlets 27' and wider fluid outlets 29' are positioned symmetrically about scribe lines 52. Thus, during the dicing process along scribe lines 52, if any debris is produced, the possibility of clogging any of the fluid inlets 27' or the fluid outlets 29' is minimized due to the increased width.

As noted above, microflow sensors 10 may be provided with circuit interconnects for delivering signals to and from sensing elements 18, as is conventionally known. The circuit interconnects are not shown for purposes of illustration and simplification, although it should be understood that the microflow sensors 10 may include any such conventional circuitry or other electronic elements. Typically, in semiconductor-type flow sensors, an array of openings are formed through the cap wafer, allowing for formation and passage of the interconnections.

Figure 13:
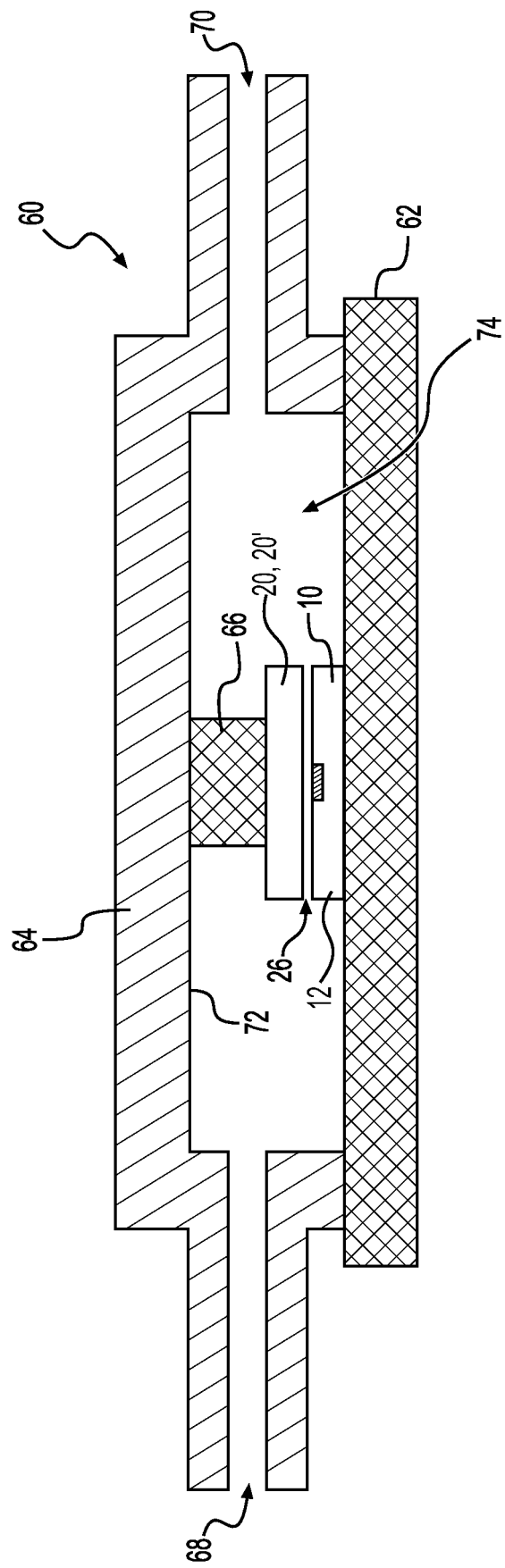
FIG. 13 is a side view in section of an exemplary flow sensor package including the semiconductor flow sensor chip.

As shown in FIG. 13, the microflow sensor 10 may be integrated into a flow sensor package 60, which includes a package substrate 62 and a hollow package cover 64. As is conventionally known in the field of flow sensors, such packages are typically provided for ease of use, particularly for chip and semiconductor-based flow sensors, such as microflow sensor 10, which are typically relatively small in overall size. The flow sensor package 60 allows for ease of connection to macroscopic sources of fluid to be tested and measured.

The hollow cover 64 is mounted on the substrate 62 to define an open interior region 74. The hollow cover 64 is provided with first and second laterally opposed fluid flow ports 68, 70. The microflow sensor 10 is mounted on the substrate 62 within the open interior region 74 with the flow channel 26 aligned in the same direction as the ports 68, 70. A longitudinally extending fluid barrier 66 may be mounted between the upper surface of the cap wafer of flow sensor 10 and an inner surface 72 of the hollow cover 64 transverse to the direction of fluid flow to define an inlet chamber and an outlet chamber and to prevent unwanted fluid cross-flow within the package 60. It should be understood that the overall configuration of the hollow cover 64 and the substrate 62 are shown for exemplary purposes only. Similarly, it should be understood that the fluid flow ports 68, 70 are shown for exemplary purposes only, and may be adapted for connection to any suitable supply of fluid to be analyzed, including any suitable type of nozzles, connectors or the like. It will further be noted that the package 60 is exemplary only, and that the microflow sensor 10 may be mounted in any other semiconductor package that allows for fluid flow through the sensor 10 from one side through the opposite side.

It is to be understood that the microflow sensor and a method of making the same are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A microflow sensor, comprising:
   a base wafer of semiconductor material having opposed upper and lower surfaces;
   a flow sensing element embedded in the upper surface of the base wafer and exposed at the upper surface of the base wafer; and
   a cap wafer of semiconductor material having opposed upper and lower surfaces and opposed side edges, the lower surface of the cap wafer having a fluid flow channel defined therein extending continuously between and through the opposed side edges of the cap wafer, the lower surface of the cap wafer being bonded to the upper surface of the base wafer with the fluid flow channel aligned with the flow sensing element so that a fluid flowing through the fluid flow channel passes above and across the exposed flow sensing element, the fluid flow channel terminating in a fluid inlet and a fluid outlet, the fluid inlet and the fluid outlet being positioned along the opposed side edges of the cap wafer, the fluid flow channel having a central portion and a pair of longitudinally extending portions, the central portion being positioned above the flow sensing element when the base wafer is bonded to the cap wafer, each of the longitudinally extending portions of the fluid flow channel having a width less than the central portion, the fluid inlet and the fluid outlet each having widths greater than the width of the longitudinally extending portions of the fluid flow channel.

2. The microflow sensor as recited in claim 1, wherein the lower surface of the cap wafer has at least one groove is defined therein, the at least one groove being adapted for preventing adhesive from entering the fluid flow channel when the lower surface of the cap wafer is bonded to the upper surface of the base wafer.

3. The microflow sensor as recited in claim 1, further comprising a semiconductor package having a first side and an opposed second side, a fluid inlet port defined in the first side, and a fluid outlet port defined in the opposed second side, the bonded wafers being mounted within the semiconductor package with the microflow sensor fluid inlet aligned with the semiconductor package fluid inlet port and the microflow sensor fluid outlet aligned with the semiconductor package fluid outlet port.

4. The microflow sensor as recited in claim 1, wherein said flow sensing element comprises a semiconductor flow sensing element.

5. The microflow sensor as recited in claim 1, wherein said flow sensing element comprises a thermoanemometer flow sensor having a heater element and first and second temperature sensing elements symmetrically disposed on opposite sides of the heater element, the thermoanemometer flow sensor being disposed transversely to a direction of fluid flow between the fluid inlet and the fluid outlet.

6. A method of making a microflow sensor, comprising the steps of:
   etching a plurality of linearly extending parallel flow channels in a lower surface of a cap wafer sheet between and through opposite edges thereof;

embedding a plurality of flow sensing elements in an upper surface of a base wafer sheet in a rectangular array having a plurality of rows and columns;

selecting a thickness of an adhesive layer such that a spacing between the cap wafer sheet and the base wafer sheet is matched to a desired flow impedance when the cap wafer sheet and the base wafer sheet are bonded together;

applying the adhesive layer with the selected thickness to bond the lower surface of the cap wafer sheet to the upper surface of the base wafer sheet with the flow channels of the cap wafer sheet aligned with the rows of flow sensing elements embedded in the base wafer sheet;

dicing the bonded wafer sheets between the parallel flow channels and the rows of flow sensing elements to form separated strips of microflow sensor dies; and dicing the separated strips of microflow sensor dies between adjacent columns of the flow sensing elements to form a plurality of microflow sensor dies.

7. The method of making a microflow sensor as recited in claim 6, wherein:

each of the linearly extending parallel flow channels etched in the lower surface of the cap wafer sheet comprises an individual longitudinally extending fluid flow channel;

each of the individual longitudinally extending fluid flow channels terminates in a fluid inlet and a fluid outlet;

each of the individual longitudinally extending fluid flow channels has a central portion and a pair of longitudinally extending portions, each of the longitudinally extending portions of each of the individual longitudinally extending fluid flow channels having a width less than the corresponding central portion; and the fluid inlet and the fluid outlet of each of the individual longitudinally extending fluid flow channels each has a width greater than the width of the longitudinally extending portions of the corresponding individual longitudinally extending fluid flow channel.

8. The method of making a microflow sensor as recited in claim 6, further comprising the step of etching at least one groove in the lower surface of the cap wafer sheet, the at least one groove being adapted for preventing the adhesive layer from entering the plurality of linearly extending parallel flow channels during the step of applying the adhesive layer.

9. The method of making a microflow sensor as recited in claim 6, further comprising the step of selecting a width of each of the linearly extending parallel flow channels prior to the step of etching the plurality of linearly extending parallel flow channels in the lower surface of the cap wafer sheet, the width of each of the linearly extending parallel flow channels being selected to match a desired flow impedance.

10. A method of making a microflow sensor, comprising the steps of:

selecting a width of each of a plurality of linearly extending parallel flow channels to match a desired flow impedance;

etching the plurality of linearly extending parallel flow channels at the selected width in a lower surface of a cap wafer sheet between and through opposite edges thereof;

embedding a plurality of flow sensing elements in an upper surface of a base wafer sheet to provide a rectangular array of the flow sending elements, the array defining a plurality of rows and columns;

bonding the lower surface of the cap wafer sheet to the upper surface of the base wafer sheet with the flow channels of the cap wafer sheet aligned with the rows of flow sensing elements embedded in the base wafer sheet;

dicing the bonded wafer sheets between the parallel flow channels and the rows of flow sensing elements to form separated strips of microflow sensor dies; and dicing the separated strips of microflow sensor dies between adjacent columns of the flow sensing elements to form a plurality of microflow sensor dies.

11. The method of making a microflow sensor as recited in claim 10, wherein:

each of the linearly extending parallel flow channels etched in the lower surface of the cap wafer sheet comprises an individual longitudinally extending fluid flow channel;

each of the individual longitudinally extending fluid flow channels terminates in a fluid inlet and a fluid outlet, each of the individual longitudinally extending fluid flow channels having a central portion and a pair of longitudinally extending portions;

each of the longitudinally extending portions of each of the individual longitudinally extending fluid flow channels has a width less than the corresponding central portion; and the fluid inlet and the fluid outlet of each of the individual longitudinally extending fluid flow channels each has a width greater than the width of the longitudinally extending portions of the corresponding individual longitudinally extending fluid flow channel.

12. The method of making a microflow sensor as recited in claim 10, further comprising the step of etching at least one groove in the lower surface of the cap wafer sheet, the at least one groove being adapted for preventing the adhesive layer from entering the plurality of linearly extending parallel flow channels during the step of applying the adhesive layer.

13. The method of making a microflow sensor as recited in claim 10, further comprising the step of selecting a thickness of an adhesive layer such that a spacing between the cap wafer and the base wafer is matched to a desired flow impedance, the step of bonding the lower surface of the cap wafer sheet to the upper surface of the base wafer sheet comprising applying the adhesive layer with the selected thickness.

* * * * *